(12) United States Patent
Li (10) Patent No.: US 11,637,634 B2
(45) Date of Patent: Apr. 25, 2023

(54) LASER EMISSION SYSTEM AND METHOD FOR COMPENSATING FOR WAVELENGTH DRIFT

(71) Applicant: CHENGDU SUPERXON COMMUNICATION TECHNOLOGY CO., LTD., Sichuan (CN)

(72) Inventor: Haiyuan Li, Sichuan (CN)

(73) Assignee: CHENGDU SUPERXON COMMUNICATION TECHNOLOGY CO., LTD., Sichuan (CN)

( * ) Notice: Subject to any disclaimer, the term of this patent is extended or adjusted under 35 U.S.C. 154(b) by 50 days.

(21) Appl. No.: 17/285,638

(22) PCT Filed: Oct. 16, 2019

(86) PCT No.: PCT/CN2019/111516
§ 371 (c)(1),
(2) Date: Apr. 15, 2021

(87) PCT Pub. No.: WO2020/078397
PCT Pub. Date: Apr. 23, 2020

(65) Prior Publication Data
US 2021/0384980 A1 Dec. 9, 2021

(30) Foreign Application Priority Data

Oct. 18, 2018 (CN) .......................... 201811215809.0

(51) Int. Cl.
*H04B 10/572* (2013.01)
*H04B 10/50* (2013.01)

(52) U.S. Cl.
CPC ......... *H04B 10/503* (2013.01); *H04B 10/572* (2013.01)

(58) Field of Classification Search
CPC .. H04B 10/503; H04B 10/572; H04B 10/501; H04B 10/50; H04B 10/502;
(Continued)

(56) References Cited

U.S. PATENT DOCUMENTS 10,488,260 B1 * 11/2019 Vakhshoori ........... G01J 3/0289
2015/0063812 A1    3/2015 Dove et al.
(Continued)

FOREIGN PATENT DOCUMENTS

CN           106253994 A  * 12/2016  ........... H01S 3/0675
CN           106253994 A    12/2016
(Continued)

OTHER PUBLICATIONS

International Search Report, Application No. PCT/CN2019/111516, dated Jan. 16, 2020, 2 pages.
(Continued)

*Primary Examiner* — Hibret A Woldekidan
(74) *Attorney, Agent, or Firm* — Ziegler IP Law Group LLC (57) ABSTRACT

Provided are a laser emission system and a method for compensating for wavelength drift. The laser emission system includes a burst signal controller, a laser emitting chip, a TEC controller, and a TEC, the TEC is attached to the laser emitting chip, the burst signal controller is connected with the laser emitting chip and the TEC controller, respectively, the TEC controller is connected with the TEC, and the burst signal controller simultaneously sends a burst control signal to the laser emitting chip and the TEC controller; the laser emitting chip activates or deactivates a laser based on the received burst control signal; the TEC controller correspondingly controls a target temperature of the TEC based on the received burst control signal, so that the target temperature of the TEC is low when the laser is activated, (Continued)

and the target temperature of the TEC is high when the laser is deactivated.

20 Claims, 4 Drawing Sheets

(58) Field of Classification Search
CPC ............... H04B 10/564; H01S 5/02415; H01S 5/06835; H01S 5/06837; H01S 5/024; H01S 5/02407; H01S 5/02423; H01S 5/0243
USPC .......................... 398/182, 183, 186, 189, 197
See application file for complete search history.

(56) References Cited

U.S. PATENT DOCUMENTS

| | | | |
|---|---|---|---|
| 2016/0111856 A1 | 4/2016 | Yan et al. | |
| 2018/0006728 A1* | 1/2018 | Yuda | H04B 10/40 |
| 2019/0190615 A1* | 6/2019 | Xue | H01S 5/06837 |

FOREIGN PATENT DOCUMENTS

| | | |
|---|---|---|
| CN | 106684703 A | 5/2017 |
| CN | 106899353 A | 6/2017 |
| CN | 107508139 A | 12/2017 |
| CN | 108604933 A | 9/2018 |
| CN | 109450554 A | 3/2019 |

OTHER PUBLICATIONS

The State Intellectual Property Office of People's Republic of China, First Office Action, Application No. 201811215809.0, dated Jan. 20, 2021, 7 pages.
PCT, Written Opinion of The International Searching Authority, dated Jan. 16, 2020, 5 pages.
First Search of Priority Document, Application No. 2018112158090, 1 page.
Korea Intellectual Property Office, Request for the Submission of an Opinion, Application No. 10-2021-7010059, dated Jun. 27, 2022, 4 pages, English Translation Attached, 5 pages.
The State Intellectual Property Office of People's Republic of China, The Second Office Action, Application No. 201811215809.0, dated Sep. 8, 2021, 9 pages, English Translation, 12 pages.

* cited by examiner

FIG. 8

LASER EMISSION SYSTEM AND METHOD FOR COMPENSATING FOR WAVELENGTH DRIFT

CROSS-REFERENCE TO RELATED APPLICATIONS

The present disclosure claims priority to Chinese Patent Application No. 201811215809.0, filed with the Chinese Patent Office on Oct. 18, 2018, entitled "Laser Emission System and Method for Compensating for Wavelength Drift", the contents of which are incorporated herein by reference in their entirety.

TECHNICAL FIELD

The present disclosure relates to the technical field of optical communications, and in particular to a laser emission system and a method for compensating for wavelength drift.

BACKGROUND ART

With a rapid increase of the need for the information transmission bandwidth, a large number of PONs (Passive Optical Networks) have been built to meet the development of network traffic. In an ONU (Optical Network Unit) of a TWDM-PON (Time and Wavelength Division Multiplexed Passive Optical Network) and an ONU of a NGPON2 (Next Generation Passive Optical Network stage 2), an optical signal emitted by the ONU includes short optical packets and long optical packets, and optical packets of different lengths are corresponding to different levels of heat energy. A wavelength of light to be emitted from a laser device is related to the temperature of the laser emitting chip, and the wavelength is longer if the temperature is higher, therefore a fluctuation of the wavelength, i.e., a wavelength drift, occurs when the optical packet is switched between different lengths. Once the wavelength drifts, the normal operation of the PON system with multiple wavelength channels will be affected.

Figure 1:
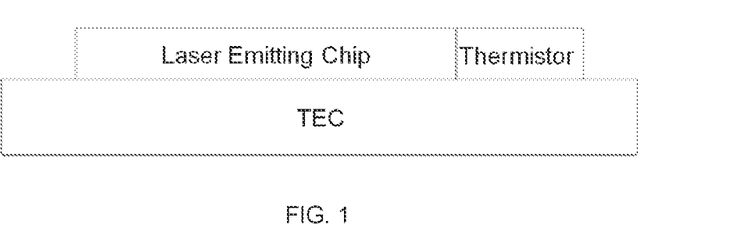
FIG. 1 is a schematic diagram showing a structure of a prior art laser emission system.

In order to solve the problem of wavelength drift, in some prior art technologies, a thermistor and a TEC (Thermoelectric Cooler) are disposed near the laser emitting chip, as shown in FIG. 1. The thermistor is configured to sense the temperature of the chip, and then feed the corresponding information back to the TEC, and the TEC controls the temperature by a PID (Proportion Integration Differentiation) operation based on the information fed back from the thermistor. However, a fixed period of time is required for the process from the generation of a temperature change signal by the thermistor to the transmission of the signal to the TEC controller and the subsequent operation of the TEC controller calculating a control amount by PID and controlling the TEC to heat or cool the laser device in accordance with the control amount, in particular, the process from a change in temperature of the TEC to the transmission of the temperature to the laser emitting chip requires a dixed period of time, and eventually, these additions of time will cause a slower temperature response speed of the TEC. Especially when a short optical packet is to be emitted, there is a problem that the short optical packet has already been emitted before the thermistor feeds back the temperature change to the TEC. Therefore, in the prior temperature adjustment method, when the laser emission system operates in a burst mode, the temperature of the chip is still unstable, and the problem of wavelength drift still exists.

SUMMARY

In order to solve at least the above technical problem, a first aspect of the present disclosure provides a laser emission system, the laser emission system comprising: a burst signal controller, a laser emitting chip, a TEC controller, and a TEC, wherein the TEC is attached directly or indirectly to the laser emitting chip, the burst signal controller is connected with the laser emitting chip and the TEC controller, respectively, and the TEC controller is connected with the TEC;

the burst signal controller is configured to simultaneously send a burst control signal to the laser emitting chip and the TEC controller;

the laser emitting chip is configured to activate or deactivate a laser based on the received burst control signal; and the TEC controller is configured to correspondingly control a target temperature of the TEC based on the received burst control signal, so that the target temperature of the TEC is approximated to a low temperature when the laser is activated, and the target temperature of the TEC is approximated to a high temperature when the laser is deactivated, and a temperature difference between the high temperature and the low temperature matches a temperature change resulting from the activation of the laser.

Optionally, the laser emitting chip activates the laser when the received burst control signal is a first signal, and deactivates the laser when the received burst control signal is a second signal, and the TEC controller controls the target temperature of the TEC to be approximated to the low temperature when the received burst control signal is the first signal, and controls the target temperature of the TEC to be approximated to the high temperature when the received burst control signal is the second signal.

Optionally, the TEC controller comprises a high temperature signal terminal, a low temperature signal terminal, a transfer switch, and a TEC driver, wherein the transfer switch is configured to connect the high temperature signal terminal or the low temperature signal terminal to the TEC driver based on the burst control signal, and the TEC driver is configured to drive the TEC.

Alternatively, the transfer switch is a single-pole double-throw switch, wherein a first immovable end of the transfer switch is connected with the high temperature signal terminal, a second immovable end of the transfer switch is connected with the low temperature signal terminal, and an output end of the single-pole double-throw switch is connected with a temperature setting pin of the TEC driver.

Alternatively, the transfer switch comprises a first PMOS transistor, a second PMOS transistor, and an inverter, wherein a gate of the first PMOS transistor is connected with the burst signal controller, a source of the first PMOS transistor is connected with the low temperature signal terminal, a drain of the first PMOS transistor is connected with a temperature setting pin of the TEC driver, a gate of the second PMOS transistor is connected with the burst signal controller via the inverter, a source of the second PMOS transistor is connected with the high temperature signal terminal, and a drain of the second PMOS transistor is connected with the temperature setting pin of the TEC driver.

Optionally, the TEC driver controls the TEC by using PID hardware.

Optionally, the laser emission system may further comprise a temperature acquisition component, wherein the temperature acquisition component is connected with the TEC driver, and the temperature acquisition component is configured to acquire a temperature of the laser emission system and send the temperature to the TEC driver so that the TEC driver performs PID control on the TEC based on the temperature acquired by the temperature acquisition component. For example, the temperature acquisition component may be a thermistor.

Optionally, an RC low-pass filter is further provided between the output end of the transfer switch and the TEC driver.

Correspondingly, the present disclosure further provides a method for compensating for wavelength drift, which is applicable to a laser emission system, the laser emission system comprising a burst signal controller, a laser emitting chip, a TEC controller, and a TEC, wherein the TEC is attached directly or indirectly to the laser emitting chip, the burst signal controller is connected with the laser emitting chip and the TEC controller, respectively, the TEC controller is connected with the TEC, and the method for compensating comprising steps of:

the burst signal controller simultaneously sending a burst control signal to the laser emitting chip and the TEC controller;

the laser emitting chip activating or deactivating a laser based on the received burst control signal;

the TEC controller correspondingly controlling a target temperature of the TEC based on the received burst control signal, so that the target temperature of the TEC is approximated to a low temperature when the laser is activated, and the target temperature of the TEC is approximated to a high temperature when the laser is deactivated, and a temperature difference between the high temperature and the low temperature matches a temperature change resulting from the activation of the laser.

Optionally, the burst control signal includes a first signal and a second signal; the laser emitting chip activates the laser when the received burst control signal is the first signal, and deactivates the laser when the received burst control signal is the second signal, and the TEC controller controls the target temperature of the TEC to be approximated to the low temperature when the received burst control signal is the first signal, and controls the target temperature of the TEC to be approximated to the high temperature when the received burst control signal is the second signal.

Optionally, the TEC controller comprises a high temperature signal terminal, a low temperature signal terminal, a transfer switch, and a TEC driver, wherein the transfer switch is configured to connect the high temperature signal terminal or the low temperature signal terminal to the TEC driver based on the burst control signal, and the TEC driver is configured to drive the TEC.

Alternatively, the transfer switch is a single-pole double-throw switch, wherein a first immovable end of the transfer switch is connected with the high temperature signal terminal, a second immovable end of the transfer switch is connected with the low temperature signal terminal, and an output end of the single-pole double-throw switch is connected with a temperature setting pin of the TEC driver.

Alternatively, the transfer switch comprises a first PMOS transistor, a second PMOS transistor, and an inverter, wherein a gate of the first PMOS transistor is connected with the burst signal controller, a source of the first PMOS transistor is connected with the low temperature signal terminal, a drain of the first PMOS transistor is connected with a temperature setting pin of the TEC driver, a gate of the second PMOS transistor is connected with the burst signal controller via the inverter, a source of the second PMOS transistor is connected with the high temperature signal terminal, and a drain of the second PMOS transistor is connected with the temperature setting pin of the TEC driver.

Optionally, the TEC driver controls the TEC by using PID hardware.

Optionally, the laser emission system may further comprise a temperature acquisition component, wherein the temperature acquisition component is connected with the TEC driver, and the temperature acquisition component is configured to acquire a temperature of the laser emission system and send the temperature to the TEC driver so that the TEC driver performs PID control on the TEC based on the temperature acquired by the temperature acquisition component. For example, the temperature acquisition component may be a thermistor.

Optionally, an RC low-pass filter is further provided between an output end of the transfer switch and the TEC driver.

Compared with the prior art, in the solutions proposed in the embodiments of the present disclosure, the burst signal controller is connected with both the laser emitting chip and the TEC controller, respectively, such that the burst signal controller may simultaneously send a burst control signal to the laser emitting chip and the TEC controller, so that the TEC controller and the laser emitting chip can simultaneously receive the same burst control signal, therefore the TEC may synchronously change the target temperature of the TEC based on the activation and deactivation of the laser emitted by the laser emitting chip, without the need of waiting for the information fed back from the thermistor and then adjusting the temperature of the TEC based on the information, whereby the response speed of the TEC is increased, and wavelength drift in the laser emission system can be reduced.

DETAILED DESCRIPTION OF EMBODIMENTS

The technical solutions of the embodiments of the present disclosure will be described below clearly and completely with reference to the accompanying drawings of the embodiments of the present disclosure. It is apparent that the embodiments to be described are some, but not all of the embodiments of the present disclosure. All the other embodiments obtained by those skilled in the art in light of the embodiments of the present disclosure without inventive efforts shall fall within the scope of the present disclosure as claimed.

In the specification, the claims, and the above-mentioned accompanying drawings of the present disclosure, the terms such as "first", "second", "third", and "fourth" (if present) are intended to distinguish between similar objects but do not necessarily indicate a specific order or precedence. It should be understood that data used in this way are interchangeable in a proper circumstance, so that the embodiments described herein can be implemented in other orders than those illustrated or described herein. Moreover, the terms "including", "comprising", and any other variants thereof are intended to cover non-exclusive inclusions, and for example, a process, method, system, product, or device that includes a list of steps or units is not necessarily limited to those steps or units expressly listed, but may include other steps or units which are not expressly listed or inherent to such process, method, product, or device.

Figure 2:
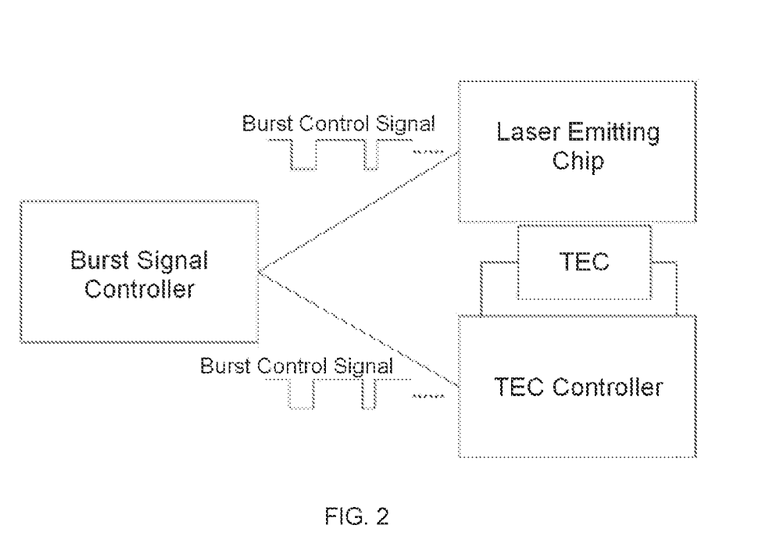
FIG. 2 is a schematic diagram showing a connection relation between components of one embodiment of a laser emission system of the present disclosure.

In one aspect, the present disclosure provides a laser emission system. In one embodiment, as shown in FIG. 2, the laser emission system comprises a burst signal controller, a laser emitting chip, a TEC controller, and a TEC.

The TEC may be attached directly to the laser emitting chip, or the TEC may be attached indirectly to the laser emitting chip via a component or material such as a heat sink. The TEC is configured to adjust the temperature of the laser emitting chip.

The burst signal controller is connected with the laser emitting chip and the TEC controller, respectively, and the burst signal controller is configured to control the laser emitting chip and the TEC controller. The TEC controller is connected with the TEC, and the TEC controller is configured to control the TEC.

When the laser emission system operates in a burst mode, the burst signal controller may simultaneously send a burst control signal to the laser emitting chip and the TEC controller. The laser emitting chip may activate or deactivate a laser based on the received burst control signal. The TEC controller may correspondingly control a target temperature of the TEC based on the received burst control signal so that the target temperature of the TEC is approximated to a low temperature when the laser is activated, and the target temperature of the TEC is approximated to a high temperature when the laser is deactivated, and a temperature difference between the high temperature and the low temperature matches a temperature change resulting from the activation of the laser.

In this embodiment, the target temperature of the TEC when laser emission is stopped is higher than the target temperature of the TEC during emission of the laser, that is to say, the laser emitting chip is preheated when the laser is deactivated, so that a difference between the temperature of the laser emitting chip in the state where the laser is activated and that in the state where the laser is deactivated is reduced, and thus wavelength drift can be reduced. In particular, the solution proposed in this embodiment can improve the problem of wavelength drift when the laser emitting chip emits a short optical packet, which is due to the fact that the short optical packet has already been sent before the temperature of the laser emitting chip is increased caused by a short laser emission time.

Moreover, in this embodiment, the burst signal controller is connected with both the laser emitting chip and the TEC controller, respectively, such that the burst signal controller may simultaneously send a burst control signal to the laser emitting chip and the TEC controller, so that the TEC controller and the laser emitting chip can simultaneously receive the same burst control signal, therefore the TEC may synchronously change the target temperature of the TEC based on the activation and deactivation of the laser emitted by the laser emitting chip, without necessarily waiting for the information fed back from the thermistor and then adjusting the temperature of the TEC based on the information, whereby the response speed of the TEC is increased.

Moreover, in this embodiment, the temperature is adjusted by the TEC, instead of by using a heating resistor. Compared with the prior technical solution in which a heating resistor is used for a temperature compensation, the solution proposed in this embodiment has the advantageous effect of being capable of controlling the temperature more accurately. In the prior technical solution in which a heating resistor is used for the temperature compensation, it is often necessary to use a TEC in combination. In such prior art technologies, the TEC is generally locked at a fixed temperature and then the temperature of the laser emitting chip is compensated by the heating resistor to reduce wavelength drift. However, in this way, a mutual interference between the heating resistor and the TEC is prone to be caused. In other words, when the heating resistor heats the laser emitting chip, the temperature of the TEC locked at a constant temperature is destroyed, the temperature balance of the TEC is broken by this temperature suddenly generated the heating resistor, and an oscillation of the temperature of the TEC is caused, which affects the control over wavelength drift. In the solution proposed in this embodiment, the temperature is adjusted by the TEC merely in a self-adaptive manner generated based on a change of the burst control signal, and the temperature is controlled accurately and stably in a fully synchronous response.

Optionally, in this embodiment, the burst control signal may be a pulsed electrical signal, wherein the pulsed electrical signal includes a first signal and a second signal.

Figure 3:
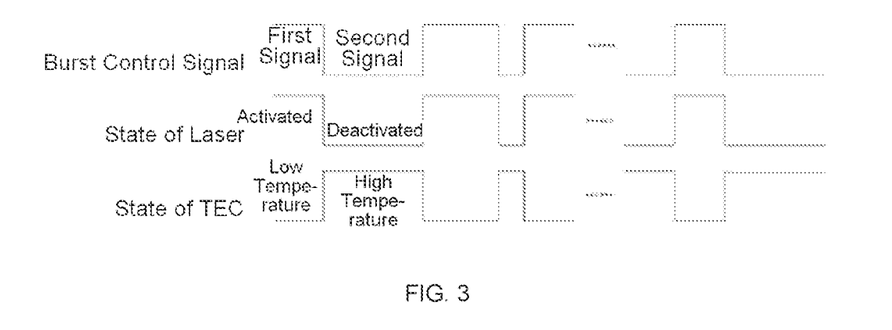
FIG. 3 is a schematic diagram showing a correspondence relation between a burst control signal, a state of a laser, and a state of a TEC according to one embodiment of a laser emission system of the present disclosure.

In one example, the first signal may be a high-level signal and the second signal may be a low-level signal. For example, as shown in FIG. 3, the laser emitting chip activates the laser when the received burst control signal is the first signal, and deactivates the laser when the received burst control signal is the second signal, and the TEC controller controls the target temperature of the TEC to be set approximately to the low temperature when the received burst control signal is the first signal, and controls the target temperature of the TEC to be set approximately to the high temperature when the received burst control signal is the second signal.

In another example, the first signal may be a low-level signal and the second signal may be a high-level signal.

It should be noted that, in other examples of this embodiment, the burst control signal may not be limited to a pulsed electrical signal, and the first signal and the second signal may not be limited to a high-level signal or a low-level signal.

Figure 4:
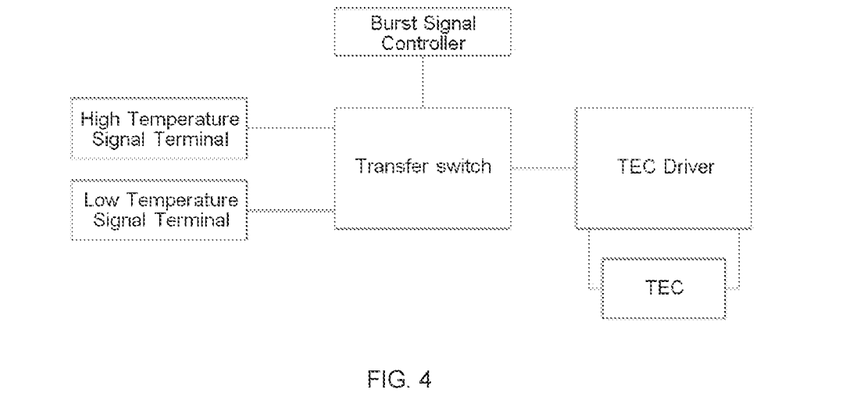
FIG. 4 is a schematic diagram showing the structure of one embodiment of a TEC controller of a laser emission system of the present disclosure.

Optionally, as shown in FIG. 4, in this embodiment, the TEC controller may comprise a high temperature signal terminal, a low temperature signal terminal, a transfer switch, and a TEC driver.

The transfer switch is configured to connect the high temperature signal terminal or the low temperature signal terminal to the TEC driver based on the burst control signal, and the TEC driver is configured to drive the TEC.

In this embodiment, the low temperature signal terminal outputs a low temperature signal conforming to a format of a signal receivable by the TEC driver, the high temperature signal terminal outputs a high temperature signal conforming to the format of the signal receivable by the TEC driver, and the transfer switch is controlled by the burst control signal to transmit a temperature signal from the high temperature signal terminal or the low temperature signal terminal to the TEC driver. The TEC driver controls the target temperature of the TEC to be approximated to the low temperature when the low temperature signal is received, and the TEC driver controls the target temperature of the TEC to be approximated to the high temperature when the high temperature signal is received.

Optionally, the high temperature signal terminal and the low temperature signal terminal may be connected directly with a temperature setting pin of the TEC driver. Generally, the burst control signal changes very quickly. With the structure proposed in this embodiment, the burst control signal can be rapidly converted by a hardware circuit into a high temperature signal or a low temperature signal that can be received by the TEC driver and transmitted to the TEC driver, whereby the response speed of the TEC is ensured, that is to say, the purpose of self-adaption is completely achieved.

In addition, in this embodiment, only two signal terminals and one switch are required to achieve the conversion of the burst control signal into a temperature signal that can be received by the TEC driver, with a simple structure and low price.

Optionally, the TEC driver may perform PID control on the TEC by using PID hardware so as to further ensure the response speed of the TEC.

Optionally, the laser emission system may further comprise a temperature acquisition component, wherein the temperature acquisition component is connected with the TEC driver, and the temperature acquisition component is configured to acquire a temperature of the laser emission system and send the temperature to the TEC driver so that the TEC driver performs PID control on the TEC based on the temperature acquired by the temperature acquisition component. For example, the temperature acquisition component may be a thermistor.

Figure 5:
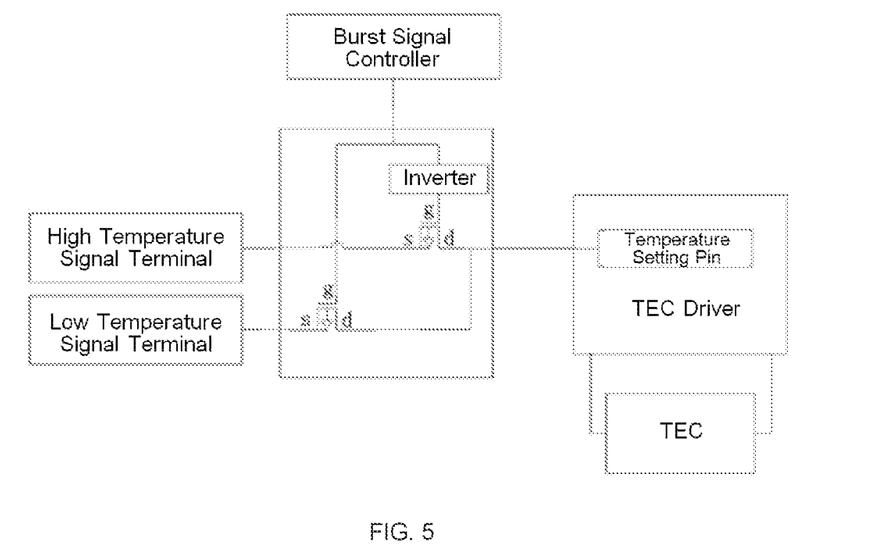
FIG. 5 is a schematic diagram showing the structure of one embodiment of a TEC controller of a laser emission system of the present disclosure.

Optionally, in one example, as shown in FIG. 5, the transfer switch may comprise a first PMOS transistor, a second PMOS transistor, and an inverter, wherein a gate of the first PMOS transistor is connected with the burst signal controller, a source of the first PMOS transistor is connected with the low temperature signal terminal, a drain of the first PMOS transistor is connected with a temperature setting pin of the TEC driver, a gate of the second PMOS transistor is connected with the burst signal controller via the inverter, a source of the second PMOS transistor is connected with the high temperature signal terminal, and a drain of the second PMOS transistor is connected with the temperature setting pin of the TEC driver.

Figure 6:
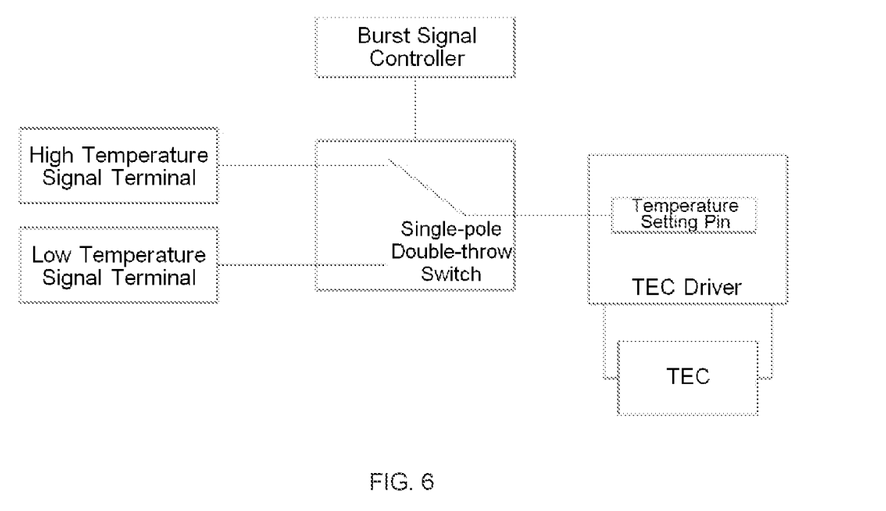
FIG. 6 is a schematic diagram showing the structure of one embodiment of a TEC controller of a laser emission system of the present disclosure.

Optionally, in another example, as shown in FIG. 6, in this embodiment, the transfer switch is a single-pole double-throw switch, wherein a first immovable end of the transfer switch is connected with the high temperature signal terminal, a second immovable end of the transfer switch is connected with the low temperature signal terminal, an output end of the single-pole double-throw switch is connected with a temperature setting pin of the hardware TEC driver, and a movable end of the transfer switch is connected with the low temperature signal terminal when the laser is activated, and is connected with the high temperature signal terminal when the laser is deactivated based on the signal sent by the burst signal controller.

Compared with the aforementioned implementation of the transfer switch using PMOS transistors, the solution proposed in this embodiment has the advantageous effects including saving the area of a circuit board and reducing cost, and can avoid EMI (Electromagnetic Interference) formed when the PMOS transistor switch is continuously switched on and off at high speed, and therefore can avoid interference with other devices.

Figure 7:
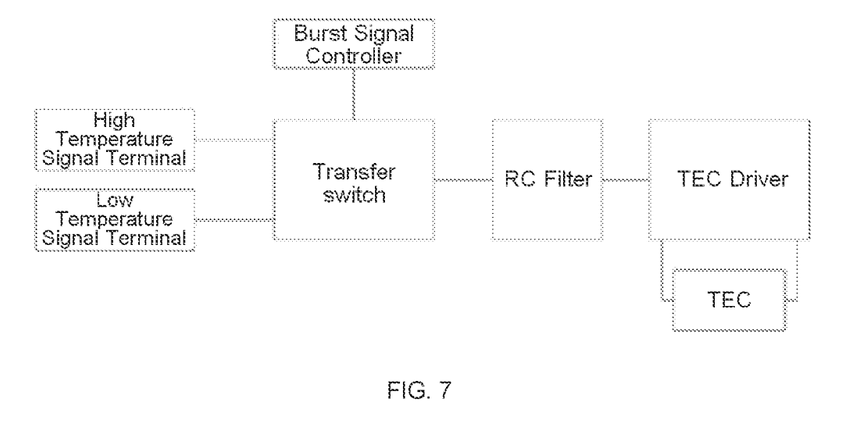
FIG. 7 is a schematic diagram showing the structure of one embodiment of a TEC controller of a laser emission system of the present disclosure.

Optionally, as shown in FIG. 7, in this embodiment, an RC low-pass filter may be further provided between the output end of the transfer switch and the TEC driver. Noise generated by the switch during switching can be removed by using the RC filter.

Figure 8:
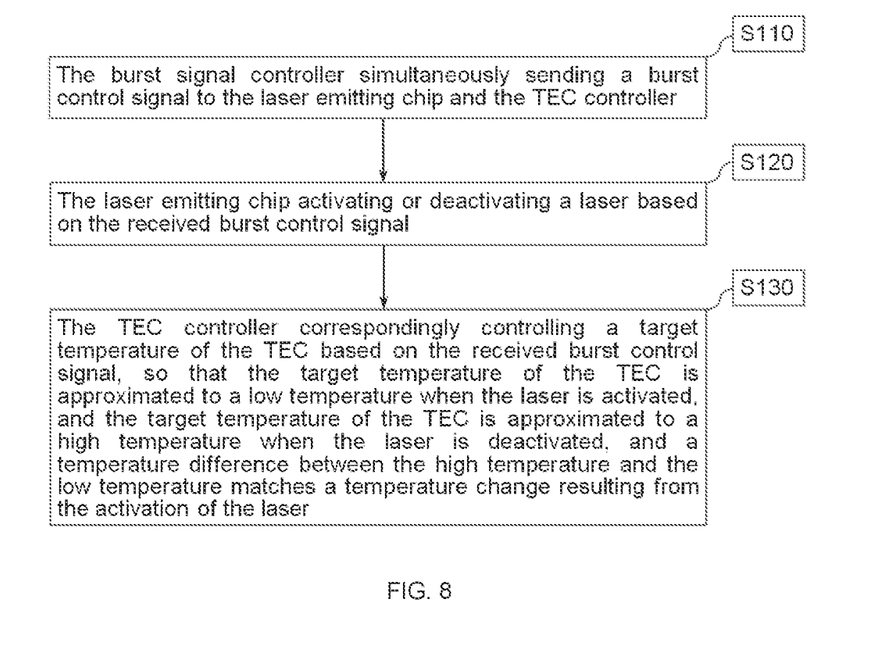
FIG. 8 is a flow chart showing the method for compensating for wavelength drift of the present disclosure.

This embodiment also provides a method for compensating for wavelength drift, which is applicable to a laser emission system. As shown in FIG. 2, the laser emission system comprises a burst signal controller, a laser emitting chip, a TEC controller, and a TEC. The TEC is attached directly to the laser emitting chip, or is attached indirectly to the laser emitting chip via a component or material such as a heat sink, and the TEC is configured to adjust the temperature of the laser emitting chip. The burst signal controller is connected with the laser emitting chip and the TEC controller, respectively, and the burst signal controller is configured to control the laser emitting chip and the TEC controller. The TEC controller is connected with the TEC, and the TEC controller is configured to control the TEC. Referring to FIG. 8, the method for compensating for wavelength drift may comprise the following steps.

In step S110, the burst signal controller simultaneously sends a burst control signal to the TEC controller and the laser emitting chip.

In step S120, the laser emitting chip activates or deactivates a laser based on the received burst control signal.

In step S130, the TEC controller correspondingly controls a target temperature of the TEC based on the received burst control signal, so that the target temperature of the TEC is approximated to a low temperature when the laser is activated, and the target temperature of the TEC is approximated to a high temperature when the laser is deactivated, and a temperature difference between the high temperature and the low temperature matches a temperature change resulting from the activation of the laser.

Optionally, in this embodiment, the burst control signal may be a pulsed electrical signal, wherein the pulsed electrical signal including a first signal and a second signal. The first signal may be a high-level signal and the second signal may be a low-level signal, or the first signal may be a low-level signal and the second signal may be a high-level signal.

The laser emitting chip activates the laser when the received burst control signal is the first signal, and deactivates the laser when the received burst control signal is the second signal, and the TEC controller controls the target temperature of the TEC to be approximated to the low temperature when the received burst control signal is the first signal, and controls the target temperature of the TEC to be approximated to the high temperature when the received burst control signal is the second signal.

Optionally, in one example, the TEC controller comprises a high temperature signal terminal, a low temperature signal terminal, a transfer switch, and a TEC driver, the transfer switch is configured to connect the high temperature signal terminal or the low temperature signal terminal to the TEC driver based on the burst control signal, and the TEC driver is configured to drive the TEC.

Optionally, in one example, the transfer switch comprises a first PMOS transistor, a second PMOS transistor, and an inverter, wherein a gate of the first PMOS transistor is connected with the burst signal controller, a source of the first PMOS transistor is connected with the low temperature signal terminal, a drain of the first PMOS transistor is connected with a temperature setting pin of the TEC driver, a gate of the second PMOS transistor is connected with the burst signal controller via the inverter, a source of the second PMOS transistor is connected with the high temperature signal terminal, and a drain of the second PMOS transistor is connected with the temperature setting pin of the TEC driver.

Optionally, in one example, the TEC driver performs PID control on the TEC by using PID hardware.

Optionally, the laser emission system may further comprise a temperature acquisition component, wherein the temperature acquisition component is connected with the TEC driver, and the temperature acquisition component is configured to acquire a temperature of the laser emission system and send the temperature to the TEC driver so that the TEC driver performs PID control on the TEC based on the temperature acquired by the temperature acquisition component. For example, the temperature acquisition component may be a thermistor.

Optionally, in one example, the transfer switch is a single-pole double-throw switch, wherein a first immovable end of the transfer switch is connected with the high temperature signal terminal, a second immovable end of the transfer switch is connected with the low temperature signal terminal, an output end of the single-pole double-throw switch is connected with a temperature setting pin of the TEC driver, and a movable end of the transfer switch is connected with the low temperature signal terminal when the laser is activated, and is connected with the high temperature signal terminal when the laser is deactivated.

Optionally, in one example, an RC low-pass filter is further provided between the output end of the transfer switch and the TEC driver. Noise generated by the switch during switching can be removed by using the RC filter.

It should be noted that the embodiments in this specification are described in a progressive manner, each embodiment focuses on differences from other embodiments, and reference can be made to the respective embodiments for the same or similar parts between the embodiments.

The above is merely illustrative of preferred embodiments of the present disclosure, and it should be noted that the above preferred embodiments are not to be considered as limiting the present disclosure, and the scope of protection of the present disclosure should be determined by the scope defined by the claims. It will be understood by those ordinarily skilled in the art that several improvements and modifications may be made without departing from the spirit and scope of the present disclosure, and such improvements and modifications shall also be considered as fallen within the scope of protection of the present disclosure.

INDUSTRIAL APPLICABILITY

In the laser emission system and the method for compensating for wavelength drift proposed in the present disclosure, the burst signal controller is connected with the laser emitting chip and the TEC controller, respectively, such that the burst signal controller may simultaneously send a burst control signal to the laser emitting chip and the TEC controller, so that the TEC controller and the laser emitting chip can simultaneously receive the same burst control signal, therefore the TEC may synchronously change the target temperature of the TEC based on the activation and deactivation of the laser emitted by the laser emitting chip, without the need of waiting for the information fed back from the thermistor and then adjusting the temperature of the TEC based on the information, whereby the response speed of the TEC is increased.

Moreover, in the present disclosure, the temperature is adjusted by the TEC, instead of by using a heating resistor. Compared with the prior technical solution in which a heating resistor is used for temperature compensation, in the solution proposed in the present disclosure, the temperature is adjusted by the TEC merely in a self-adaptive manner generated based on a change of the burst control signal, and the temperature is controlled accurately and stably in a fully synchronous response.

What is claimed is:

1. A laser emission system comprising: a burst signal controller, a laser emitting chip, a Thermoelectric Cooler (TEC) controller, and a Thermoelectric Cooler (TEC),
    wherein the TEC is attached directly or indirectly to the laser emitting chip, the burst signal controller is connected with the laser emitting chip and the TEC controller, respectively, and the TEC controller is connected with the TEC;
    the burst signal controller is configured to simultaneously send a burst control signal to the laser emitting chip and the TEC controller;
    the laser emitting chip is configured to activate or deactivate a laser based on a received burst control signal; and
    the TEC controller is configured to correspondingly control a target temperature of the TEC based on the received burst control signal, so that the target temperature of the TEC is approximated to a first temperature when the laser is activated, and the target temperature of the TEC is approximated to a second temperature when the laser is deactivated, and a temperature difference between the second temperature and the first temperature matches a temperature change resulting from the activation of the laser, wherein the first temperature is lower than the second temperature.

2. The system according to claim 1, wherein the laser emitting chip is configured to activate the laser when the received burst control signal is a first signal, and deactivate the laser when the received burst control signal is a second signal, and the TEC controller is configured to control the target temperature of the TEC to be approximated to the first temperature when the received burst control signal is the first signal, and control the target temperature of the TEC to be approximated to the second temperature when the received burst control signal is the second signal.

3. The system according to claim 2, wherein the TEC controller comprises a second temperature signal terminal, a first temperature signal terminal, a transfer switch, and a TEC driver, the transfer switch is configured to connect the second temperature signal terminal or the first temperature signal terminal to the TEC driver based on the burst control signal, and the TEC driver is configured to drive the TEC.

4. The system according to claim 1, wherein the TEC controller comprises a second temperature signal terminal, a first temperature signal terminal, a transfer switch, and a TEC driver, the transfer switch is configured to connect the second temperature signal terminal or the first temperature signal terminal to the TEC driver based on the burst control signal, and the TEC driver is configured to drive the TEC.

5. The system according to claim 4, wherein the transfer switch is a single-pole double-throw switch, wherein a first immovable end of the transfer switch is connected with the second temperature signal terminal, a second immovable end of the transfer switch is connected with the first temperature signal terminal, and an output end of the single-pole double-throw switch is connected with a temperature setting pin of the TEC driver.

6. The system according to claim 5, wherein the TEC driver controls the TEC by using Proportion Integration Differentiation (PID) hardware.

7. The system according to claim 5, wherein an RC low-pass filter is further provided between the output end of the transfer switch and the TEC driver.

8. The system according to claim 4, wherein the transfer switch comprises a first PMOS transistor, a second PMOS transistor, and an inverter, wherein a gate of the first PMOS transistor is connected with the burst signal controller, a source of the first PMOS transistor is connected with the first temperature signal terminal, a drain of the first PMOS transistor is connected with a temperature setting pin of the TEC driver, a gate of the second PMOS transistor is connected with the burst signal controller via the inverter, a source of the second PMOS transistor is connected with the second temperature signal terminal, and a drain of the second PMOS transistor is connected with the temperature setting pin of the TEC driver.

9. The system according to claim 4, wherein the TEC driver controls the TEC by using Proportion Integration Differentiation (PID) hardware.

10. The system according to claim 9, wherein the laser emission system further comprises a temperature acquisition component, wherein the temperature acquisition component is connected with the TEC driver, and the temperature acquisition component is configured to acquire a temperature of the laser emission system and send the temperature to the TEC driver so that the TEC driver performs PID control on the TEC based on the temperature acquired by the temperature acquisition component.

11. The system according to claim 4, wherein an RC low-pass filter is further provided between the output end of the transfer switch and the TEC driver.

12. A method for compensating for wavelength drift which is applicable to a laser emission system, the laser emission system comprising a burst signal controller, a laser emitting chip, a TEC controller, and a TEC, wherein the TEC is attached directly or indirectly to the laser emitting chip, the burst signal controller is connected with the laser emitting chip and the TEC controller, respectively, the TEC controller is connected with the TEC, and the method for compensating comprising steps of:

the burst signal controller simultaneously sending a burst control signal to the laser emitting chip and the TEC controller;

the laser emitting chip activating or deactivating a laser based on the received burst control signal;

the TEC controller correspondingly controlling a target temperature of the TEC based on the received burst control signal, so that the target temperature of the TEC is approximated to a first temperature when the laser is activated, and the target temperature of the TEC is approximated to a second temperature when the laser is deactivated, and a temperature difference between the second temperature and the first temperature matches a temperature change resulting from the activation of the laser, wherein the first temperature is lower than the second temperature.

13. The method according to claim 12, wherein the burst control signal includes a first signal and a second signal; the laser emitting chip is configured to activate the laser when the received burst control signal is the first signal, and deactivate the laser when the received burst control signal is the second signal, and the TEC controller is configured to control the target temperature of the TEC to be approximated to the first temperature when the received burst control signal is the first signal, and control the target temperature of the TEC to be approximated to the second temperature when the received burst control signal is the second signal.

14. The method according to claim 13, wherein the TEC controller comprises a second temperature signal terminal, a first temperature signal terminal, a transfer switch, and a TEC driver, the transfer switch is configured to connect the second temperature signal terminal or the first temperature signal terminal to the TEC driver based on the burst control signal, and the TEC driver is configured to drive the TEC.

15. The method according to claim 12, wherein the TEC controller comprises a second temperature signal terminal, a first temperature signal terminal, a transfer switch, and a TEC driver, the transfer switch is configured to connect the second temperature signal terminal or the first temperature signal terminal to the TEC driver based on the burst control signal, and the TEC driver is configured to drive the TEC.

16. The method according to claim 15, wherein the transfer switch is a single-pole double-throw switch, wherein a first immovable end of the transfer switch is connected with the second temperature signal terminal, a second immovable end of the transfer switch is connected with the first temperature signal terminal, and an output end of the single-pole double-throw switch is connected with a temperature setting pin of the TEC driver.

17. The method according to claim 15, wherein the transfer switch comprises a first PMOS transistor, a second PMOS transistor, and an inverter, wherein a gate of the first PMOS transistor is connected with the burst signal controller, a source of the first PMOS transistor is connected with the first temperature signal terminal, a drain of the first PMOS transistor is connected with a temperature setting pin of the TEC driver, a gate of the second PMOS transistor is connected with the burst signal controller via the inverter, a source of the second PMOS transistor is connected with the second temperature signal terminal, and a drain of the second PMOS transistor is connected with the temperature setting pin of the TEC driver.

18. The method according to claim 15, wherein the TEC driver controls the TEC by using PID hardware.

19. The method according to claim 18, wherein the laser emission system further comprises a temperature acquisition component, wherein the temperature acquisition component is connected with the TEC driver, and the temperature acquisition component is configured to acquire a temperature of the laser emission system and send the temperature to the TEC driver so that the TEC driver performs PID control on the TEC based on the temperature acquired by the temperature acquisition component.

20. The method according to claim 15, wherein an RC low-pass filter is further provided between an output end of the transfer switch and the TEC driver.

* * * * *